(12) United States Patent
Cole et al.

(10) Patent No.: US 7,239,612 B1
(45) Date of Patent: Jul. 3, 2007

(54) METHOD AND APPARATUS FOR DISCARDING A PRIORITIZED FAIR SHARE OF TRAFFIC OF NETWORK CONNECTIONS

(75) Inventors: Philip D. Cole, Redwood City, CA (US); Nils Ramon Marchant, Ocean Reef (AU); Mike Reynolds, Sublaco (AU); Edward G. Cavasian, San Carlos, CA (US); James P. Scott, Santa Clara, CA (US)

(73) Assignee: Network Equipment Technologies, Inc, Fremont, CA (US)

( * ) Notice: Subject to any disclaimer, the term of this patent is extended or adjusted under 35 U.S.C. 154(b) by 809 days.

(21) Appl. No.: 10/035,791

(22) Filed: Oct. 18, 2001

(51) Int. Cl.
*H04J 1/16* (2006.01)
*H04J 3/14* (2006.01)

(52) U.S. Cl. .................. 370/230.1; 370/231; 370/237; 370/395.1; 370/412; 709/240

(58) Field of Classification Search ........ 370/229–238, 370/389, 412–418, 428–429, 395.1; 709/240
See application file for complete search history.

(56) References Cited

U.S. PATENT DOCUMENTS

| | | | |
|---|---|---|---|
| 5,602,841 A * | 2/1997 | Lebizay et al. ............. | 370/413 |
| 5,818,818 A * | 10/1998 | Soumiya et al. ........... | 370/252 |
| 5,966,163 A | 10/1999 | Lin et al. | |
| 6,084,869 A * | 7/2000 | Fishman et al. ........... | 370/348 |
| 6,167,030 A | 12/2000 | Kilkki et al. | |
| 6,452,915 B1 | 9/2002 | Jorgensen | |
| 6,487,202 B1 | 11/2002 | Klausmeier et al. | |
| 6,532,234 B1 * | 3/2003 | Yoshikawa et al. ...... | 370/395.4 |
| 6,549,992 B1 | 4/2003 | Armangau et al. | |
| 6,556,578 B1 | 4/2003 | Silberschatz | |
| 6,606,301 B1 | 8/2003 | Muller et al. | |
| 6,618,390 B1 | 9/2003 | Erimli et al. | |
| 6,687,225 B1 | 2/2004 | Kawarai et al. | |
| 6,785,236 B1 * | 8/2004 | Lo et al. .................... | 370/235 |
| 6,788,697 B1 | 9/2004 | Aweya et al. | |
| 6,788,701 B1 * | 9/2004 | Mahalingaiah et al. .... | 370/429 |
| 6,820,128 B1 | 11/2004 | Firoiu et al. | |
| 6,829,224 B1 | 12/2004 | Goldman et al. | |
| 6,856,596 B2 | 2/2005 | Blumer et al. | |

(Continued)

OTHER PUBLICATIONS

U.S. Appl. No. 10/045,187, Lowpensky.

(Continued)

*Primary Examiner*—John Pezzlo
*Assistant Examiner*—Inder Pal Mehra
(74) *Attorney, Agent, or Firm*—Townsend and Townsend and Crew LLP

(57) ABSTRACT

A method and apparatus are provided for discarding a priority fair share of traffic of network connections. In one example, the method receives traffic of at least a particular network connection. A portion of a fixed buffer allocation space is filled with traffic of the particular network connection, wherein a buffer in the fixed buffer allocation space is associated with a fixed buffer allocation queue identification. A portion of a prioritized fair share buffer space is filled with traffic of the particular network connection, wherein a buffer in the prioritized fair share buffer space is associated with a priority fair share queue identification. A portion of the lowest priority traffic of the network connections is discarded.

32 Claims, 6 Drawing Sheets

U.S. PATENT DOCUMENTS

| | | |
|---|---|---|
| 6,868,065 B1 | 3/2005 | Kloth et al. |
| 6,870,854 B1 | 3/2005 | Aimoto et al. |
| 6,894,969 B1 | 5/2005 | Chidambaran et al. |
| 6,904,015 B1 | 6/2005 | Chen et al. |
| 6,907,041 B1 * | 6/2005 | Turner et al. ............... 370/412 |
| 6,918,005 B1 | 7/2005 | Merchant et al. |
| 2002/0176403 A1 * | 11/2002 | Sangha et al. ............. 370/412 |
| 2002/0176424 A1 * | 11/2002 | Knight et al. ............ 370/395.4 |
| 2002/0194436 A1 | 12/2002 | McKenney |
| 2003/0002505 A1 | 1/2003 | Hoch et al. |
| 2005/0175014 A1 * | 8/2005 | Patrick .................. 370/395.43 |

OTHER PUBLICATIONS

U.S. Appl. No. 10/045,290, Lewis et al.

* cited by examiner

METHOD AND APPARATUS FOR DISCARDING A PRIORITIZED FAIR SHARE OF TRAFFIC OF NETWORK CONNECTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present application is related to U.S. patent application Ser. No. 10/045,187, entitled, "METHOD AND APPARATUS FOR RANDOM EARLY DETECTION OF DATA PACKETS OF NETWORK CONNECTIONS", filed Oct. 18, 2001; and is also related to U.S. patent application Ser. No. 10/045,290, entitled, "METHOD AND APPARATUS FOR INSERTING EMPTY MEMORY CELLS INTO A DATA FLOW OF NETWORK CONNECTIONS OF A COMPUTER NETWORK", filed Oct. 18, 2001; and is also related to U.S. patent application Ser. No. 10/045,288 (now U.S. Pat. No. 6,918,005), entitled, "METHOD AND APPARATUS FOR CACHING FREE MEMORY CELL POINTERS", filed Oct. 18, 2001; the disclosures of which are herein incorporated by reference.

FIELD OF THE INVENTION

The present invention generally relates to quality of service on computer networks, such as the Internet. The present invention more particularly relates to increasing quality of service on computer networks by selectively discarding network traffic.

DISCUSSION OF BACKGROUND

It is hard to dismiss the entrepreneurial nature of the Internet today—this is no longer a research project. For most organizations connected to the global Internet, it's a full-fledged business interest. Having said that, it is equally hard to dismiss the poor service quality that is frequently experienced—the rapid growth of the Internet, and increasing levels of traffic, make it difficult for Internet users to enjoy consistent and predictable end-to-end levels of service quality.

The Internet has historically offered a single level of service, that of "best effort," where all data packets are treated with equity in the network. However, we are finding that the Internet itself does not offer a single level of service quality, and some areas of the network exhibit high levels of congestion and consequently poor quality, while other areas display consistent levels of high quality service. Customers are now voicing a requirement to define a consistent service quality they wish to be provided, and network service providers are seeking ways in which to implement such a requirement. This effort is happening within the umbrella called "Quality of Service" (QoS). Example factors that effect QoS on the Internet include delay, bandwidth, and reliability.

Delay is the elapsed time for a packet to be passed from the sender, through the network, to the receiver. The higher the delay, the greater the stress that is placed on the transport protocol to operate efficiently. For the TCP protocol, higher levels of delay imply greater amounts of data held "in transit" in the network, which in turn places stress on the counters and timers associated with the protocol. It should also be noted that TCP is a-"self-clocking" protocol, where the sender's transmission rate is dynamically adjusted to the flow of signal information coming back from the receiver, via the reverse direction acknowledgments (ACK's), which notify the sender of successful reception. The greater the delay between sender and receiver, the more insensitive the feedback loop becomes, and therefore the protocol becomes more insensitive to short term dynamic changes in network load. For interactive voice and video applications, the introduction of delay causes the system to appear unresponsive.

Bandwidth is the maximal data transfer rate that can be sustained between two end points. It should be noted that this is limited not only by the physical infrastructure of the traffic path within the transit networks, which provides an upper bound to available bandwidth, but is also limited by the number of other flows which share common components of this selected end-to-end path.

Reliability is commonly considered a property of the transmission system, and in this context, it can be thought of as the average error rate of the medium. Reliability can also be a byproduct of the switching system. A poorly configured or poorly performing switching system can alter the order of packets in transit, delivering packets to the receiver in a different order than that of the original transmission by the sender, or even dropping packets through transient routing loops.

The Internet is composed of a-collection of routers and transmission links. Routers receive an incoming packet, determine the next hop interface, and place the packet on the output queue for the selected interface. Transmission links have characteristics of delay, bandwidth and reliability. Poor service quality is typically encountered when the level of traffic selecting a particular hop exceeds the transmission bandwidth of the hop for an extended period time. In such cases, the router's (or transmission link's) output queues associated with the saturated transmission hop begin to fill, causing additional transit delay, until the point is reached where the queue is filled, and the router (or transmission link) is then forced to discard packets or at least portions of packets (reduced reliability). This in turn forces adaptive flows to reduce their sending rate to minimize congestion loss, reducing the available bandwidth for the application.

Unfortunately, present methods of discarding traffic from congested queues have been inadequate, given the increasingly demanding transmission needs of users of the Internet.

SUMMARY OF THE INVENTION

It has been recognized that what is needed is a way to efficiently discard traffic from congested queues of network devices. Broadly speaking, the present invention fills this need by providing a method and an apparatus for discarding a prioritized fair share of network traffic. It should be appreciated that the present invention can be implemented in numerous ways, including as a process, an apparatus, a system, a device or a method. Several inventive embodiments of the present invention are described below.

A method is provided for discarding a prioritized fair share of traffic of network connections. The method comprises receiving traffic of at least a particular network connection; filling a portion of a fixed buffer allocation space with traffic of the particular network connection, wherein a buffer in the fixed buffer allocation space is associated with a fixed buffer allocation queue identification; filling a portion of a prioritized fair share buffer space with traffic of the particular network connection, wherein a buffer in the prioritized fair share buffer space is associated with a priority fair share queue identification; and discarding a portion of lowest priority traffic of the network connections.

In another embodiment, a method is provided for allocating memory buffer space for traffic of network connections. The method comprises designating fixed buffer allocation space, wherein buffers in the fixed buffer allocation space are associated with fixed buffer allocation queue identifications; and designating prioritized fair share buffer space, wherein buffers in the prioritized fair share buffer space are associated with priority fair share queue identifications.

In still another embodiment, an integrated circuit configured to discard a priority fair share of traffic of network connections is provided. The integrated circuit comprises controlling circuitry configured to control operations of: filling a portion of a fixed buffer allocation space with traffic of the particular network connection; filling a portion of a prioritized fair share buffer space with traffic of the particular network connection; and discarding a portion of lowest priority traffic of the network connections.

Advantageously, the present invention demonstrates that high quality of service (QoS) is possible in the Internet, even with increasingly demanding transmission requirements. Accordingly, it has been recognized that different customers have different QoS needs. For example, Internet users requiring large bandwidth connections need a higher QoS than Internet users requiring smaller bandwidth connections. The present invention exploits these variances in needs amongst customers. The present invention makes it possible to deliver differentiated levels of best effort traffic in a manner which is predictable, fairly consistent, and which provides the ability to offer discriminated service levels to different customers and to different applications.

The invention encompasses other embodiments of a method, an apparatus, and a computer-readable medium, which are configured as set forth above and with other features and

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

Figure 1:
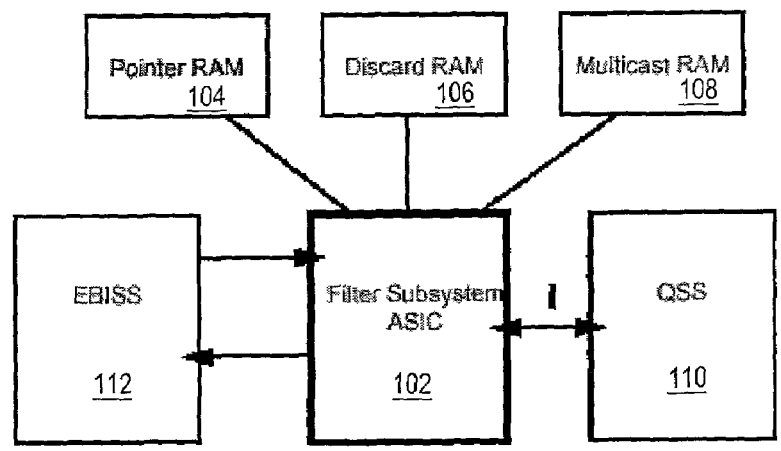
FIG. 1 shows the environment in which the Filter Subsystem (FSS) ASIC operates, in accordance with one embodiment of the present invention.

An invention is disclosed for a method and an apparatus for discarding a prioritized fair share of network traffic. Numerous specific details are set forth in order to provide a thorough understanding of the present invention. It will be understood, however, to one skilled in the art, that the present invention may be practiced without some or all of these specific details.

The list below provides a quick reference to acronyms used in this disclosure.

AAL5—ATM Adaptation Layer Type 5—single bit field in CD which indicates that cells on a connection constitute CPAAL5_PDU packets.
Acc—Accumulation counter.
ABR—Available Bit Rate—QoS traffic class defined by the ATM Forum.
AvgOccCIDs—Average of NumOccCIDs.
CAC—Connection Admission Control—Network Management system level process which controls usage of bandwidth by connections.
CBR—Continuous Bit Rate.
CD—CellDescriptor—the collection of fields used by the Cell Control Path to identify one cell.
CDDisc—CD processed by Discard block.
CDexEB—CD received by FSS from Egress Backplane Interface Subsystem.
CDMC—CD of MC replicated cell which contains a dummy CellPointer.
CellPtr—CellPointer—address of cell in the Cell Buffer.
CID—ConnectionID—the 16 bit identifier which binds a cell to a connection between an incoming VPI/VCI and an outgoing VPI/VCI.
CIDCount—per-CID cell buffer occupancy.
CLP—Cell Loss Priority—ATM Cell Header field in which cell can be 'tagged'.
CPU—Central Processing Unit—Management Processor which monitors and controls the SIF board and provides the interface to the network management.
EBISS—Egress Backplane Interface Subsystem.
EOF—End of Frame—flag which indicates the end of a CPAAL5_PDU (packet).
EPD—Early Packet Discard—buffer management scheme applied by Discard block to AAL5 connections.
EPSS—Egress Processor Subsystem.
ER—.Explicit Rate—mode of ABR operation.
Exp—Exponent part of exponential form.
FBA—Fixed Buffer Allocation—Buffer management scheme applied by Discard block to real time connections.
f-RM—Forward RM cell of ABR connections.
FSS—Filter Subsystem.
Lim—Limit, minimum guaranteed cell buffer space.
Mant—Mantissa part of exponential form.
MaxQLength—Maximum Queue Length.
MC—Multicast—single bit field in CD which indicates that replication is required.

MCC—single bit field in CD which indicates that the CD is a MC copy and as such contains a 'dummy' CellPointer.
MTS—Main Timing Sequence—fixed length sequence of ASIC clock cycles.
NRT—Non Real Time—traffic class which is not sensitive to cell delay or cell delay variation.
NumOccCIDs—number of occupied CIDs (on which at least one cell is held in the buffer).
OAM—Operations Administration and Maintenance (cell).
Occ—Per-QueueID cell buffer occupancy.
PFS—Prioritized Fair Share—buffer management scheme applied by Discard block to non real time connections.
PFSOcc—Occupancy of the PFS cell buffer space.
PFSUnresOcc—Occupancy of the unreserved portion of PFS cell buffer space.
PPD—Partial Packet Discard—buffer management scheme applied by Discard block to AAL5 connections.
PTI—Payload Type Identifier—ATM Cell Header field.
PURO—PFSUnresOcc.
QueueID—Queue Identifier—4 bit field priority field (0 is highest).
QID—QueueID—4 bit field priority field (0 is highest).
QoS—Quality of Service.
QSS—Queue Subsystem.
RED—Random Early Detection.
RM—Resource Management cell in which ABR flow control information is carried.
rt-VBR—real time VBR.
SAR—Segmentation and Reassembly cell to CPU.
VBR—Variable Bit Rate.
VCI—Virtual Channel Identifier—ATM Cell Header field.
VD—Virtual Destination for ABR connections.
VPI—Virtual Path Identifier—ATM Cell Header field.
VS—Virtual Source for ABR connections.
WoA—WeightOnActive parameter for discard.

General Overview

FIG. 1 shows the environment in which the Filter Subsystem (FSS) ASIC 102 operates, in accordance with one embodiment of the present invention. The FSS includes controlling circuitry configured to control operations of the discard process. The FSS is in electrical communication with a pointer RAM 104, a discard RAM 106, a multicast RAM 108, a queue subsystem (QSS) 110, and an egress backplane interface subsystem (EBISS) ASIC 112.

High-Level Description of the Filter Subsystem (FSS)

Figure 2:
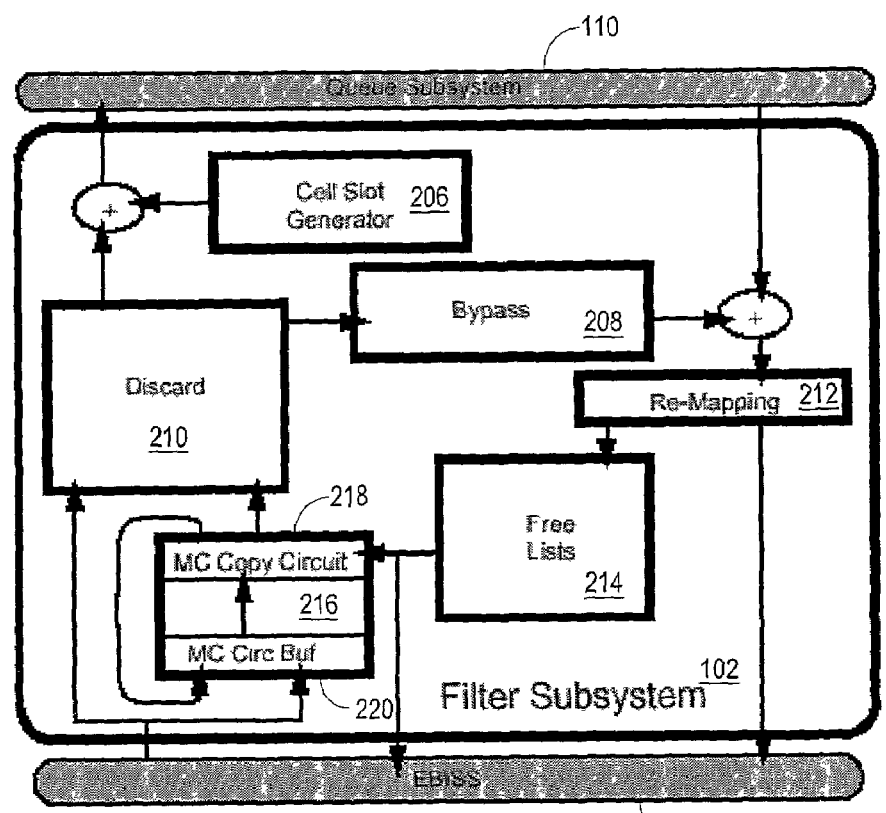
FIG. 2 is a high-level view of the FSS, in accordance with one embodiment of the present invention.

FIG. 2 is a high-level view of the FSS 102, in accordance with one embodiment of the present invention. The Filter Subsystem (FSS) manages the Cell Buffer, performs multicasting, generates empty cell timeslots for Operations Administration and Maintenance (OAM) cells and Available Bit Rate (ABR) Virtual Source (VS) forward resource management (f-RM) cells, and supports ABR explicit rate (ER) functions. The FSS 102 consists of six functional blocks—Free List 214; Multicast 216; Discard 210; Cell Slot Generator 206; Pointer Remapping 212; and Bypass 208.

User Data traffic flows from the Egress Backplane Interface Subsystem (EBISS) 112 through the Discard block 210 to the remainder of the Cell Control Path (Queue and Schedule Subsystems 110) and again through the FSS 102 to the EBISS 112. Each cell is represented by a cell descriptor (CD).

Some of that traffic is removed from the stream in the Discard block 210. Traffic from the ABR Virtual Destination (VD) forward Resource Management (f-RM) cells and the segmentation and reassembly (SAR) bypass the remainder of the Cell Control Path via the Bypass block 208. ABR and OAM cells generated by the Cell Slot Generator 206 flow through the remainder of the Cell Control Path, again through the FSS to the Egress Processor.

The free list block 214 manages cell pointers, which point to cell storage locations within the Cell Buffer. Free cell pointers are stored in two circular buffers. One cell pointer is removed from the head of one circular buffer for each incoming cell. Each cell pointer is returned to the free list when the cell is discarded or after the cell departs from the Cell Buffer. In one embodiment, 256K cell pointers are provided, upgradable to 1M. The pointer RAM is partitioned into two equal spaces—the free list space and the remapping space. The free list space stores up to 256K (upgradable to 1M) free cell pointers. The remapping space maps multicast dummy cell pointers to original cell pointers. The remapping space is the same size as the free list space. The pointer RAM is 512K*24 bit (upgradable to 2M*24 bit).

The multicast block 216 generates copies of cells by generating multiple cell descriptors (CDs) whose dummy cell pointers point to the original cell pointer and cell in the Cell Buffer. The receipt of one original cell on one incoming connection may cause the transmission of multiple copies onto a set of outgoing connections. Each incoming MC cell is appended to the tail of an MC circular buffer 220. The MC copy circuit 218 serves the head of the MC circular buffer 220 to generate copies.

The Discard block 210, which is an important aspect of the present invention, manages usage of the Cell Buffer by selectively discarding cells as they arrive. The Discard block monitors the buffer fill for each queue identification (QueueID) and for each connection within each QueueID. Higher priority QueueIDs (from priority 0) are offered more extensive use of the buffer at the expense of lower priorities. The Discard block 210 reaches discard decisions by comparing buffer fill for any connection with preconfigured thresholds for each cell loss priority (CLP). Early packet discard (EPD) and partial packet discard (PPD) are implemented on AAL5 connections so that discard occurs at the frame level instead of at the cell level. That means if any cell of a frame is discarded, the entire frame is discarded so that buffer space is not wasted storing corrupted frames. The Discard block 210 also gathers statistics to support ABR functions implemented on the ABR daughter card.

The 64K*108 bit Discard RAM stores counts, thresholds and configurable buffer management parameters for each of the 64K connections. The Discard block 210 increments per connection cell counters each time a cell is admitted to the Cell Buffer. The Discard block 210 also supports some ABR VS/VD and ER functions.

The cell slot generator 206 generates and inserts cell placeholders into which cells may be inserted by the Egress Processor Subsystem (EPSS). The Cell Slot Generator inserts ABR, OAM and other cells at the request of the EPSS via switch interface wire (SIFwire).

The Bypass block 208 provides two channels which bypass the remainder of the Cell Control Path. The Remapping block 212 remaps MC dummy cell pointers to original cell pointers, returns cell pointers to the free list circular buffers, and maintains cell counters used by the Discard block 210. Mappings of dummy cell pointers to original cell pointers are held in the Remap partition of the Pointer RAM.

Discard Process

The Discard block 210 selectively discards cells subject to Cell Buffer congestion. The Discard block 210 monitors buffer usage by maintaining counts of the total numbers of cells which occupy the Cell Buffer at any time on each connection. A unique connection identifier (CID) identifies each connection. Each connection is mapped through exactly one QueueID. So each QueueID is associated with a non-intersecting set of CIDs. The cell counters for any given connection are incremented whenever a cell from that connection is accepted into the Cell Buffer; and decremented by the Remapping block 212 whenever a cell leaves the Cell Buffer. Each counter counts both CLP=1 and CLP=0 cells to reflect the combined number of CLP(0+1) cells in the Cell Buffer. The cell counter values are used in calculations to determine whether a cell on any connection is to be accepted or discarded.

The Discard block 210 maintains four counters per QueueID which record the cumulative number of cells which have passed through the discard block, the number of discarded CLP=0 cells, discarded CLP=1 cells, and Cell Buffer occupancy for the given QueueID.

The FSS 102 provides one cell pointer to the EBISS 112 for each cell which is received irrespective of whether the cell is accepted or discarded. When a cell is to be discarded the FSS 102 returns the cell pointer of the discarded cell to the Free List so that the discarded cell can be subsequently overwritten in the Cell Buffer.

Figure 3:
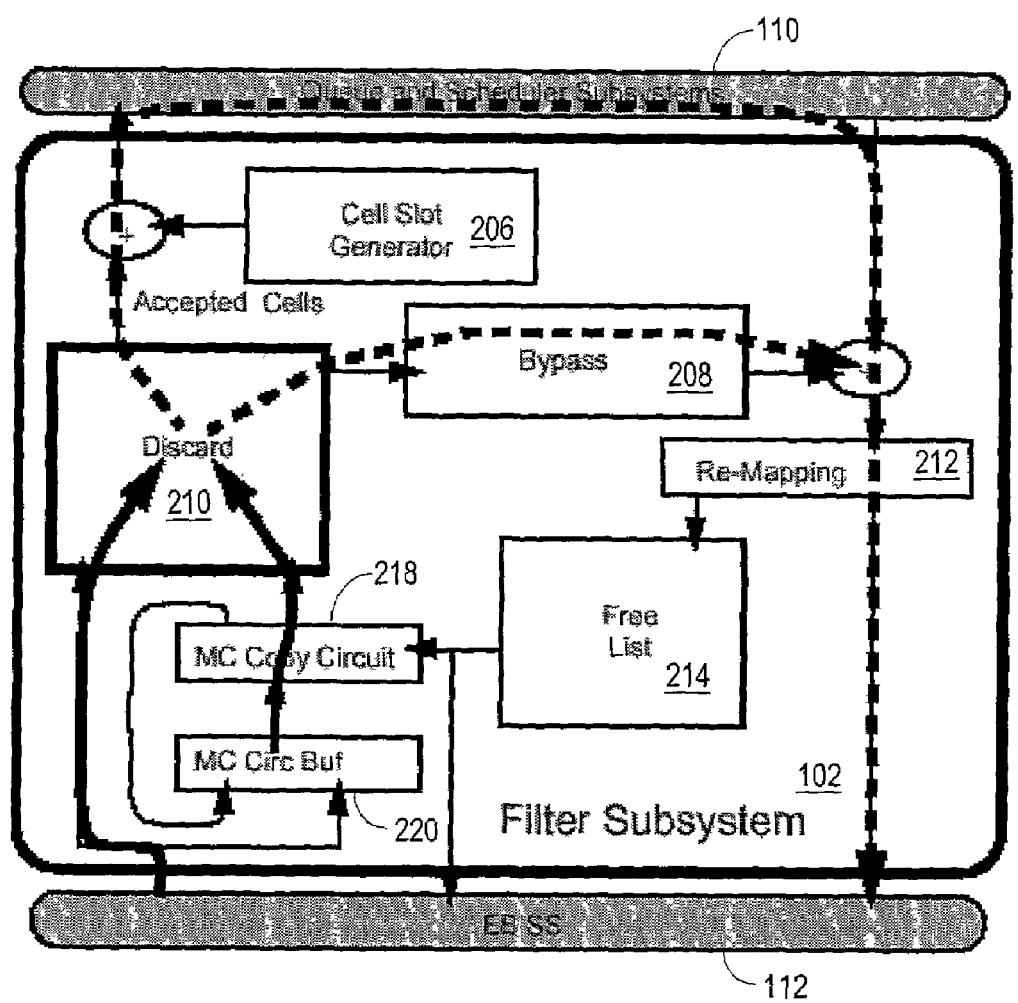
FIG. 3 illustrates two sources of CDs for the Discard block, in accordance with one embodiment of the present invention.

FIG. 3 illustrates two sources of CDs for the Discard block 210, in accordance with one embodiment of the present invention. The broken lines represent the streams of CDs which remain after the discard process.

The Discard block 210 receives CDs from two sources—the EBISS 112; and the MC Copy Circuit 218. CDs from the Multicast block 216 contain a dummy cell pointer. In one embodiment, the Discard block 210 normalizes the CD to the common format shown in Table 2 below before performing the discard processing.

TABLE 2

Example of format into which the Discard block 210 normalizes a cell descriptor (CD) performing discard processing

| type CDDisc | |
|---|---|
| CellPtr; | --CellPointer |
| EOF; | --AAL5 End of Frame |
| CLP; | --Cell Loss Priority |
| AAL5; | --connection carries AAL5 frames |
| CID; | --connection identifier |
| QID; | --QueueID |
| MCC; | --multicast copy flag |
| SAR; | --destination is local CPU |
| CellType; | |

The Discard block 210 processes CDs at the rate of 16 each main timing sequence (MTS) consisting of 12 from the EBISS and 4 from the MC block. An MTS is a fixed length sequence of ASIC clock cycles. The Discard block 210 constructs the CD CDDisc from CDs received from either the MC Copy circuit or the EBISS as shown in Table 3 below.

TABLE 3

Example function for the Discard block 210 to construct the CD CDDisc from CDs received from either the MC Copy circuit or the EBISS 112.

```
function MakeDiscCD( )
  if (type (CD) = CdexEB)
    CellPtr := GetPtr( );
    CDDisc.CellPtr := CellPtr;
    CDDisc.EOF := '1' when (CdexEB.PTI = 1 or 3) else '0';
    CDDisc.CLP := CDexEB.CLP;
```

TABLE 3-continued

Example function for the Discard block 210 to construct the CD CDDisc from CDs received from either the MC Copy circuit or the EBISS 112.

```
    CDDisc.AAL5 := CdexEB.AAL5
    CDDisc.CID := CdexEB.CID;
    CDDisc.QID := CdexEB.QID;
    CDDisc.MCC := 0;
    CDDisc.SAR := CdexEB.SAR;
  else
    CDDisc.CellPtr := CDMC.DummyPtr;
    CDDisc.EOF := '1' when (CDMC.OrigPTI = 1 or 3) else '0'
    CDDisc.CLP := CDMC.OrigCLP;
    CDDisc.AAL5 := CDMC.OrigAAL5;
    CDDisc.CID := CDMC.NewCID;
    CDDisc.QID := CDMC.QID;
    CDDisc.MCC := 1;
    CDDisc.SAR := 0;
  end MakeDiscCD
```

Preferred Discard Scheme

Preferred discard schemes include fixed buffer allocation (FBA) discard, which is typically deployed for real time behaving traffic; and "prioritized fair share" (PFS) discard, which is typically deployed for non-real time traffic. The FBA scheme, which would normally be configured for high priority CBR and rt-VBR QueueIDs, guarantees buffer space to connections.

Networks are classified into either one of two types, including "fixed buffer allocation" (FBA) connections or "prioritized fair share" (PFS) connections. A set amount of buffer space may be reserved as a whole for all FBA connections. Furthermore, each connection may have some buffer space reserved for it individually, including both FBA connection and PFS connections. That amount of space for each connection is configured semi-permanently and is determined by the parameter "Limit." The amount of space reserved individually for each FBA connection comes from the total amount of space reserved for all FBA connections. Traffic from FBA connections initially fills reserved FBA space, which is completely reserved for those connections. Similarly, traffic from PFS connections initially fills reserved PFS space, which is completely reserved for those connections, separately.

Furthermore, all connections are classified into groups of similar priorities. Each group is given a unique queue identification (QueueID). Each QueueID may be for either a group of FBA connections or a group of PFS connections. The QueueID determines the priority at which any given connection may have access to the "left over" unused portion of buffer space which is not used by other connections. This determination occurs at any point in time. Each QueueID corresponds to a different level of priority separately within each of the FBA and PFS spaces.

After a connection has consumed all the space reserved individually for that connection individually it may start to consume a "fair" share of other remaining space, up to a predefined value determined separately for each QueueID. The way that is calculated differs between FBA and PFS spaces. The exact amount of buffer space which is deemed "fair" depends on the QueueID. Connections grouped into higher priority QueueIDs have access to a greater amount of buffer space. Moreover, the amount deemed "fair" also depends on a weighting for each connection within the QueueID grouping. That per-connection weighting is determined by the "Weight On Active" parameter, for both FBA and PFS connections, as discussed below with reference to FIG. 8. This weighting may reflect bandwidth, but not necessarily.

PFS is the buffer management scheme applied by the Discard block 210 to non-real time connections. The PFS scheme dynamically assigns unused buffer space to CIDs which may require it. Sharing is prioritized between PFS QueueIDs, and fair across CIDs within any QueueID.

Figure 4:
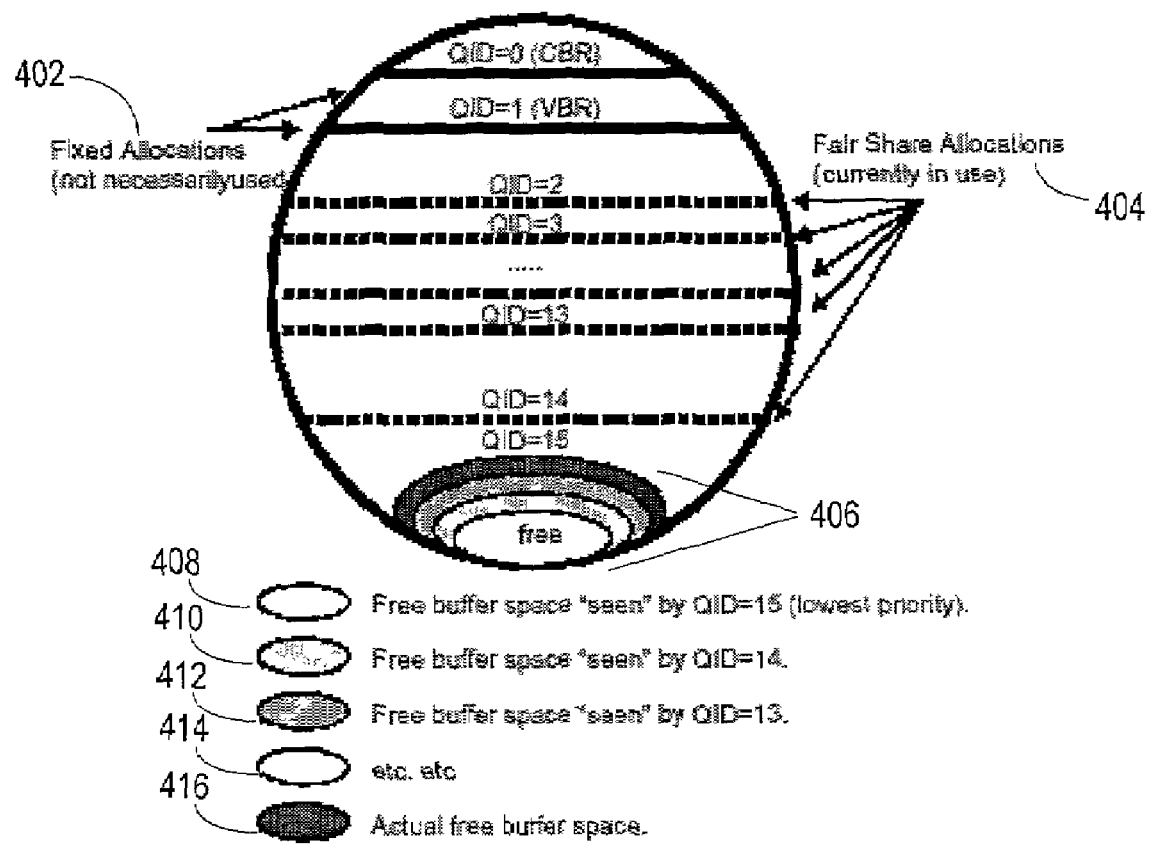
FIG. 4 shows a "snapshot" of a Cell Buffer at a time of heavy use, with discard not yet occurring, in accordance with one embodiment of the present invention.

FIG. 4 shows a "snapshot" of a Cell Buffer at a time of heavy use, with discard not yet occurring, in accordance with one embodiment of the present invention. By correctly configuring parameters the CPU is able to weigh the fairness between CIDs within any PFS QueueID to account for different bandwidth requirements. Each lower priority PFS QueueID "sees" a smaller number of free buffers, and so reaches its discard threshold earlier. This allows each higher priority PFS QueueID to deliver the guarantees needed by ensuring some buffers remain available despite the demands of lower priority QueueID traffic.

Global Parameters and Counters

Examples of global parameters held within the filter ASIC are shown in Table 4 below.

TABLE 4

Example of global parameters held within the filter ASIC

| | |
|---|---|
| type | GlobPFSInfo |
| | PFSOcc [19:0] --total number of PFS cells in Cell Buffer |
| | PFSUnresOcc [19:0] --cells in unreserved part of PFS part of buffer |

PFSOcc is a count of the total number of cells held in the Cell Buffer on all PFS QueueIDs. The FSS 102 increments PFSOcc each time a PFS cell is accepted into the Cell Buffer. PFSOcc is decremented each time a PFS cell is removed from the Cell Buffer. The PFSUnresOcc counter is described below.

Unreserved PFS Occupancy (PFSUnresOcc) Counter

The Cell Buffer space is partitioned between two discard schemes—FBA and PFS. Each QueueID is either one scheme or the other. The entire FBA partition is allocated individually to connections within FBA QueueIDs. A semi-permanent portion of that FBA buffer space is reserved for each FBA connection, strictly defined by the parameter Limit(CID). The total FBA space is the sum of MaxQLength (QueueID) across all the FBA QueueIDs, and the sum of Limit(CID) across all connections in the FBA QueueIDs.

The PFS Cell Buffer space is further partitioned into two—the space reserved for individual PFS connections; and a common unreserved pool to be shared by all PFS connections.

As shown in FIG. 4, the total Cell Buffer space is divided into three partitions, in accordance with one embodiment of the present invention. As with the FBA scheme, the amount of buffer space reserved exclusively for each PFS connection is specified by Limit(CID) for the given connection. The sum of Limit(CID) across all PFS CIDs is the total amount of PFS reserved buffer space. Each PFS connection is able to consume a share of the unreserved space in addition to the space reserved for that connection. As buffer fill due to any single PFS connection increases from empty, the connection first consumes the guaranteed space up to the Limit(CID) threshold, after which the connection may start to consume part of the shared unreserved pool.

Figure 5:
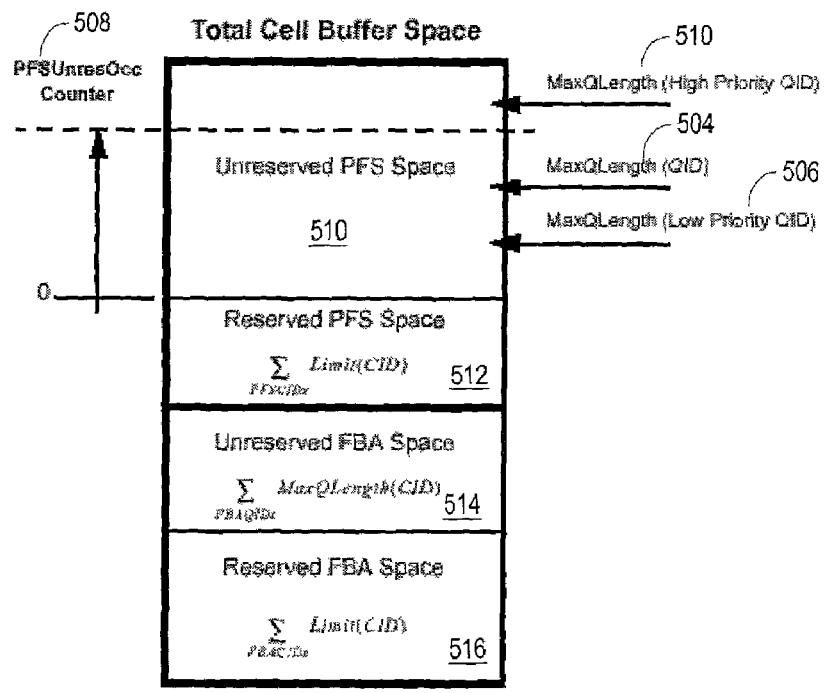
FIG. 5 shows cell buffer space partitioning, in accordance with one embodiment of the present invention.

FIG. 5 shows cell buffer space partitioning, in accordance with one embodiment of the present invention. The PFSUnresOcc counter 508 reflects the total number of cells on PFS connections in the Cell Buffer over and above the guaranteed minimum Limit(CID) on all PFS connections. FIG. 5 shows that the PFSUnresOcc counter 508 increases from zero as unreserved shared PFS buffer space 510 is consumed. The PFS MaxQLength thresholds 502, 504 and 506 determine how much of the free unreserved space may be used by each QueueID. FIG. 5 also shows that PFSUnresOcc 508 crosses successively higher MaxQLength thresholds 504 and 506 for higher priority traffic as PFSUnresOcc 508 increases. Low priority QueueIDs have access to less or zero unreserved space as PFSUnresOcc 508 becomes larger.

The PFSUnresOcc counter 508 is incremented each time a cell is accepted into the Cell Buffer on a connection whose buffer fill (CIDCount(CID)) exceeds Limit(CID) for that connection. The PFSUnresOcc counter 508 is decremented each time a cell is transmitted from the buffer while the fill exceeds Limit(CID). The PFSUnresOcc counter 508 is not altered as a result of any cell on a connection whose buffer fill is less than Limit(CID).

Two CPU interrupts are provided to notify of PFSUnresOcc counter 508 overflow and underflow, respectively—'PURO_OFLOW' and 'PURO_UFLOW'. The counter may overflow or underflow if any cell causes either an increment or a decrement, but not both. Such a condition may occur if Limit(CID) is altered while cells remain in the Cell Buffer, or if a cell becomes lost in the buffer due to a failure condition.

Figure 6:
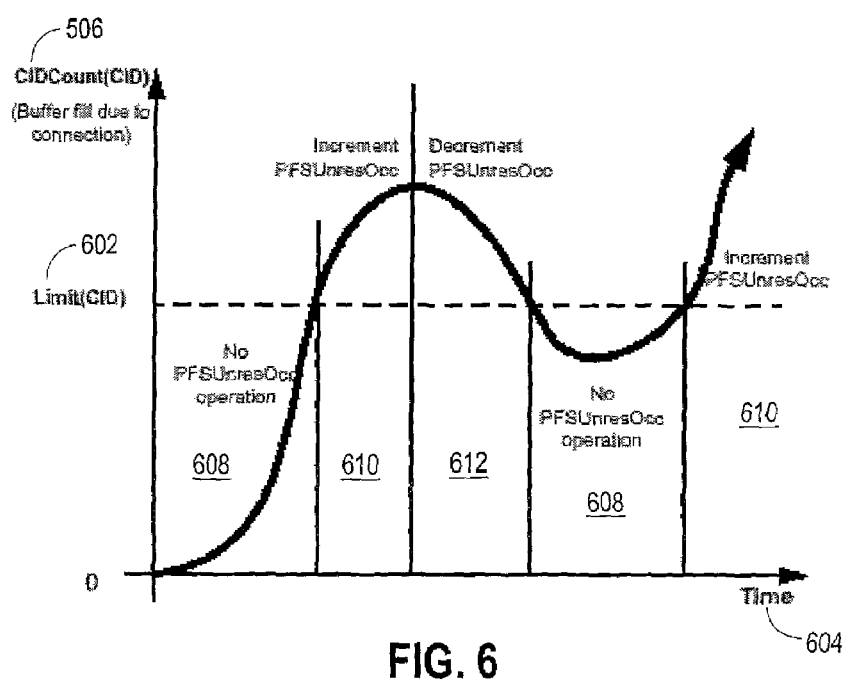
FIG. 6 shows the prioritized fair share buffer fill due to a single connection increasing from empty at first, in accordance with one embodiment of the present invention.

FIG. 6 shows the prioritized fair share buffer fill due to a single connection increasing from empty at first, in accordance with one embodiment of the present invention. A incremented PFSUnresOcc 610 occurs for cells which arrive after the buffer fill (CIDCount) exceeds Limit(CID) for that connection. A decremented PFSUnresOcc 612 occurs as cells leave the buffer, but only until the buffer fill falls to Limit(CID) again. While the buffer fill remains below Limit (CID), there is no PFSUnresOcc operation 608. In other words, PFSUnresOcc counter 508 remains unchanged by the arrival or departure of any cell on that connection. Note that PFSUnresOcc counter 508 may continue to change at any time as a result of cells on other connections whose buffer fill exceeds their respective Limit(CID) values 602. The graph of FIG. 6 shows that the incremented PFSUnresOcc 610 resume after the buffer fill exceeds Limit(CID) 602 for that connection again.

Per-QueueID Parameters and Counters

Cell Buffer space is partitioned between each of the sixteen QueueIDs. Each QueueID is configured to employ one of the two possible discard schemes. The choice of discard scheme is configurable for each QueueID, independently of any other. Table 5 below shows information that is stored for each QueueID.

TABLE 5

Example Of Information That Is Stored For Each Queueld

| | |
|---|---|
| type QueueIDInfo | |
| BufScheme; | --fixed allocation or prioritized fair share |
| Acc [31:0]; | --cumulative number of cells in QID |
| Occ [19:0]; | --cell occupancy of QID |
| Disco [31:0]; | --no. CLP=0 and CLP=1 cells discarded from QID |
| Discl [31:0]; | --no. CLP=0 and CLF=1 cells discarded from QID |
| NumOccCIDs [15:0]; | --instantaneous no. of non-empty CIDs in QID |
| MaxOccCIDs [15:0]; | --maximum no. of non-empty CIDs in QID |
| AvgOccCIDs [15:0]; | --average of NumOccCIDs |
| MaxQLength [19:0]; | --Max total permissible usage by QID |

The CPU configures some of the per-QueueID information above; the Filter maintains the state information.

The discard process determines whether or not to accept each cell in accordance with the functions defined below. Each time a cell is accepted into the Cell Buffer the cumulative count of cells for the QueueID Acc(QID) is incremented. Acc(QID) should be read at regular intervals not exceeding 1 msec by the CPU, and is cleared each time it is read. (Acc(QID) wraps around if the CPU fails to read it in time.) Acc(QID) is never decremented. The cell occupancy Occ(QID) is incremented each time a cell (CLP=0 or CLP=1) is admitted into the buffer on the QueueID, and decremented each time a cell departs. It is not possible to maintain separate per-QueueID occupancies in the FSS 102 for each CLP because the CLP of a CD may be altered by the QSS.

The FSS 102 increments or decrements NumOccCIDs (QID) each time the cell occupancy of a CID becomes non-zero or zero, respectively. That may occur up to sixteen times each MTS. The FSS 102 calculates the average number of occupied connections (for which for which the number cells is greater than zero) in each QueueID by sampling the instantaneous occupancy NumOccCIDs at 1024 evenly spaced instants during a fixed period of time not exceeding 100 msec. The FSS calculates AvgOccCIDs(QID) by cumulatively adding the 1024 (instantaneous) samples of NumOccCIDs(QID) during the period. The average occupancies are calculated by dividing the sums (one sum for each QID) by 1024 and rounding down (truncating the least significant 10 bits) and storing the quotients in the registers AvgOccCIDs(QID). The AvgOccCIDs(QID) registers may be read by the CPU. Preexisting values of AvgOccCIDs (QID) are overwritten by the FSS once each 100 msec interval.

It is important to ensure that the CPU configures each connection correctly so that each CID is never associated with more than one QueueID at any one time. Failure to do so may result in unexpected behavior of the NumOccCIDs counter, which requires that the QueueID for any CID remains constant while any CDs on that CID exist in the Cell Control Path. The QueueID associated with a CID may be changed only after all cells on that CID with the original QueueID have passed completely out of the Cell Control Path.

The FSS 102 maintains the registers Max0ccCIDs(QID) in which are stored the maximum (high water mark) NumOccCIDs occupancies during the previous 100 msec measurement period. Max0ccCIDs(QID) are overwritten by the FSS once each 100 msec interval.

Maximum Queue Length (MaxQLength)

MaxQLength is configured for each QueueID, and separately for FBA and PFS QueueIDs. Note that the interpretation of MaxQLength depends on whether the buffer scheme in use for the QueueID is PFS of FBA. MaxQLength does not include Limit(CID) space. For FBA QueueIDs MaxQLength (QueueID) is the unreserved buffer space for that queue.

For PFS QueueIDs MaxQLength(QueueID) represents the amount of unreserved PFS buffer space available for that QueueID. Higher priority QueueIDs may be allocated a greater amount of unreserved buffer space by setting MaxQLength to a higher value, as shown in FIG. 5. The set of MaxQLength values for PFS QueueIDs would thus typically form a monotonically increasing series across PFS QueueIDs of increasing priority. The MaxQLength for any PFS QueueID may therefore not exceed the amount of unreserved PFS buffer space.

Figure 7:
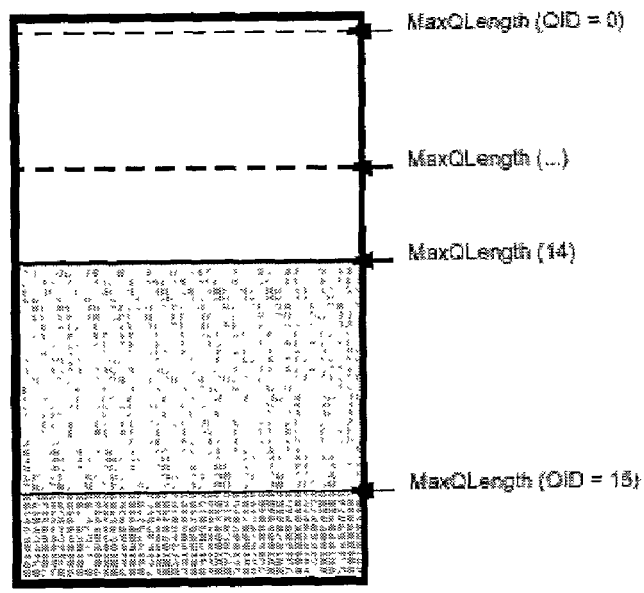
FIG. 7 illustrates the relationship between various values of the MaxQLength Parameter, in accordance with one embodiment of the present invention.

FIG. 7 illustrates the relationship between various values of the MaxQLength Parameter, in accordance with one embodiment of the present invention. Note that the MaxQLength(QueueID) parameter carries a different meaning for PFS and FBA QueueIDs. The sum of MaxQLength and Limit(CID) for all connections across all FBA QueueIDs should not exceed the buffer space allocated to FBA QueueIDs, whereas for PFS connections the restriction is that no MaxQLength may exceed the amount of unreserved PFS buffer space for any PFS QueueID.

Configuration of MaxQLength(QueueID) Parameter

If MaxQLength is to be altered for any PFS QueueID then it should only be altered if the new MaxQLength value is greater than the number of cells occupying the unreserved PFS buffer space at the time the new value takes effect. The CPU should not initiate a write of MaxQLength to any QueueID unless the new MaxQLength to be written is greater than the value of the PFSUnresOcc counter. If the condition is not met the CPU should wait until the PFSUnresOcc counter reaches a lower value. Forcing this change would result in newly arriving cells on the QueueID to be discarded if Cell Buffer fill on that connection exceeds Limit(CID) for that connection. This will be the case until PFSUnresOcc counter falls below the new MaxQLength.

Therefore the CPU should first read PFSUnresOcc and perform the MaxQLength-PFSUn-resOcc comparison before writing, with a safety margin for instantaneous variations in the value of PFSUnresOcc. (The PFSUnresOcc counter value may change 20 times each MTS.) The time elapsed from the reading of PFSUnresOcc to the writing of MaxQlength should be deterministic and limited. In performing the comparison the CPU should add an error margin to PFSUnresOcc to account for any cells which may be accepted into the unreserved PFS buffer space while performing the comparison and until the new MaxQLength value is written. The maximum rate at which cells may be accepted into the buffer, and therefore the maximum rate at which PFSUnresOcc may increase after being read is 16 each MTS. Note that no such restriction applies to the alteration of MaxQLength(QueueID) for FBA QueueIDs.

Per-Connection Parameters and Counters

The information stored in Discard RAM (one of the three external RAMs) for each CID is contained in the following structure in Table 6 below.

TABLE 6

Example of structure that contains the information stored in Discard RAM for each CID

```
type DiscRAN
  CIDCount [19:0];   --no. of cells stored from CID
  LimMant [3:0];     --minimum space guaranteed to CID mantissa
  LimExp [3:0];      --minimum space guaranteed to CID exponent
  WOA Index [7:0]    --index for WOA Ctrl, from CPU
  EOMant [3:0];      --early packet discard for CLP=0 mantissa
  EOExp [3:0];       --early packet discard for CLP=0 exponent
  E1Mant [3:0];      --early packet discard for CLP=1 mantissa
  E1Exp [3:0];       --early packet discard for CLP=1 exponent
  P1Mant [3:0];      --partial packet discard for CLP=1 mantissa
  P1Exp [3:0];       --partial packet discard for CLP=1 exponent
  AAL5State;         --within or between frames
  EPD0Flag;          --next whole CLP=0 packet to be discarded
  EPD1Flag;          --next whole CLP=1 packet to be discarded
  EPD0State;         --CLP=0 packet to be discarded
  EPD1State;         --CLP=1 packet to be discarded
```

TABLE 6-continued

Example of structure that contains the information
stored in Discard RAM for each CID

| | |
|---|---|
| PPDFlag; | --remainder of packet to be discarded |
| VS; | --enable ABR VS f-RM cell generation |
| VD; | --enable ABR VD bypass |
| ER; | --collect ABR explicit rate per-port counts |
| Parity [10:0]; | --data integrity |

The value CIDCount indicates the instantaneous number of cells held in the Cell Buffer on the given ConnectionID. The following parameters are stored in exponential format consisting of a four bit exponent (Exp) with four bit mantissa (Mant): Limit (Lim); CLP=0 early packet discard offset (EO); CLP=1 early packet discard offset (E1); CLP=1 partial packet discard offset (P1). The filter generates 20 bit integer values from the exponent and mantissa as shown below for Limit(CID):

Limit:=DiscRAM(CID).*LimMant(2*DiscRAM
    (CID).*Lim*Exp);

Configuration of Limit(CID) Parameter

The Limit(CID) parameter may not be altered for any PFS connection while cells exist in the buffer on that connection; that is, Limit(CID) may not be altered while CID-Count (CID) is non-zero. It is not possible to prevent new cells being accepted into the Cell Buffer on an active connection. Therefore Limit(CID) may only be changed after a connection has been torn down and before it is set up.

Failure to comply with this restriction will corrupt the operation of the PFSUnresOcc counter which relies on Limit(CID) remaining constant from the time any cell causes PFSUnresOcc to be incremented until the time that same cell causes PFSUnresOcc to be decremented.

Fixed Buffer Allocation Discard Scheme

Real time traffic (such as CBR and rt-VBR) would be configured to use the fixed buffer allocation discard scheme. The Fairshare is calculated separately for Fixed Buffer Allocation mode QueueIDs and for Prioritized Fair Share mode QueueIDs.

For FBA mode the fair share is the minimum buffer space allowed to the connection (Limit(CID)), plus a weighted fraction of the unreserved space allocated to the QueueID. The unreserved space allocated to the QueueID is Max-QLength(QueueID). The distinction between FBA and PFS is that PFS uses a pool of buffers common to all the PFS QueueIDs, while each FBA QueueID has its own independent pool of buffers.

The Fixed Buffer Allocation Fair Share (FBA FS) is calculated as indicated in Table 7 below (the use of the WoA parameter is described later).

TABLE 7

Example calculation of the Fixed Buffer Allocation Fair Share (FBA FS)

if (MaxQLength(QID) > Occ(QID))
    FBA_FS(CID) := (WoA(CID * (MaxQLength(QID)−Occ(QID))) +
Limit (CID);
else
    FBA_FS(CID) := Limit (CID);
end if;

The subtraction operation which calculates the amount of free space remaining is minimum bounded to zero to prevent underflow.

FBA mode discard decisions are based on the PPD1_Shared threshold which is calculated as an offset below FBA_Fairshare. The Cell Buffer space between the PPD1_Shared threshold and the fairshare should be sufficiently large to accommodate all cells from all connections in order to allow for the possibility that the space below the CLP=0 threshold is completely filled with CLP=1 cells. It is expected that (however it is not a requirement that) up to approximately 60% of the fixed buffer space would be made available between the lower CLP=1 threshold and the higher CLP=0 threshold.

No fixed allocation discard should occur while CAC and policing functions are operating correctly. Fixed allocation discard may occur when the Cell Buffer parameters are incorrectly configured, under some failure conditions, or while a traffic contract is violated.

For conservative FBA operation, WeightOnActive should be set to zero for all connections so that each connection will always have access to only the guaranteed minimum space defined by Limit(CID). WeightOnActive is set to zero by setting the WeightOnActive control word to hexadecimal value 0xFFF.

Prioritized Fair Share Discard Scheme

Delay insensitive (non-real time NRT) traffic would use QueueIDs configured for "prioritized fair share" (PFS) discard. PFS discard (1) guarantees a minimum buffer space to each connection, (2) provides access to non-guaranteed buffer space prioritized according to QueueID, and (3) provides weighted 'fair share' access between multiple connections within any given QueueID. The fair share for any given PFS CID is calculated through the combined efforts of the FSS and the CPU.

For PFS mode QueueIDs the Fair Share is the guaranteed minimum buffer space allocated to the connection (Limit (CID), plus a weighted fraction of the amount of unreserved PFS space which is available to the given QueueID. The WeightOnActive (WoA) weighting factor is calculated in the same manner as for the FBA mode, described later. The subtraction which calculates the amount of space remaining available to the QueueID is minimum bounded to zero to prevent underflow.

TABLE 8

Example Calculation For the Amount of Space Remaining Available to the QueueID.

if (MaxQLength(QID) > PFSUnresOcc)
    PFS_FS (CID) := [WoA(CID)*(MaxQLength (QID)−PFSUnresOcc)]+
Limit (CID);
else
    PFS_FS(CID) := Limit (CID);
end if;

For conservative PFS operation, WeightOnActive should be set to zero for all connections so that each connection will always have access to only the guaranteed minimum space defined by Limit(CID). WeightOnActive is set to zero by setting the WeightOnActive control word to xFFF.

Weight On Active (WoA)

The WeightOnActive multiplier is multiplied with the PFS or FBA multiplicand to generate the FairShare product. The multiplication is implemented as the sum of three binary shifts of the multiplicand. The shifts are defined by WeightOnActive which is created from an indirect lookup. Each connection (CID) is mapped to one of 256 WeightOnActive indices stored in internal RAM. The WeightOnActive index (WOA_Index) is retrieved from the discard RAM (external RAM) addressed by the CID of the cell undergoing the discard procedure. The WeightOnActive control word (WOA_Ctrl) is retrieved from internal RAM, addressed by WOA_Index.

Figure 8:
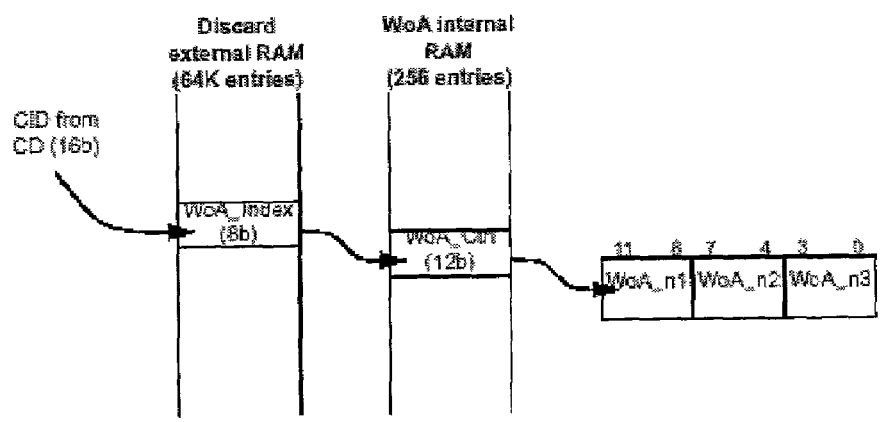
FIG. 8 is a schematic diagram of an indirect WeightOnActive (WoA) lookup, in accordance with one embodiment of the present invention.

FIG. 8 is a schematic diagram of an indirect WeightOnActive lookup, in accordance with one embodiment of the present invention. The 12-bit WeightOnActive control word consists of three four bit fields: WOA_n1, WoA_n2, WOA_n3. Each field represents a fractional multiplier which defines a shift of the multiplicand. The WoA Ctrl word sub-fields are defined in the following table.

TABLE 9

Definition of Weight On Active

| WoA_n1, n2, n3 | Comment | Amount of right shift |
| --- | --- | --- |
| x0 | divide by 64K | 16 |
| x1 | divide by 32K | 15 |
| x2 | divide by 16K | 14 |
| x3 | divide by 8K | 13 |
| x4 | divide by 4K | 12 |
| x5 | divide by 2K | 11 |
| x6 | divide by 1K | 10 |
| x7 | divide by 512 | 9 |
| x8 | divide by 256 | 8 |
| x9 | divide by 128 | 7 |
| xA | divide by 64 | 6 |
| xB | divide by 32 | 5 |
| xC | divide by 16 | 4 |
| xD | divide by 8 | 3 |
| xE | divide by 4 | 2 |
| xF | multiply by zero, i.e., clear | 20 |

The multiplier WeightOnActive is represented as the sum of three shifts. In equation form the multiplier WeightOnActive is $$WoA = ((1 \ll WoA\_n1) + (1 \ll WoA\_n2) + (1 \ll WoA\_n3))/65536. \quad \text{EQ. (1)}$$

Figure 9:
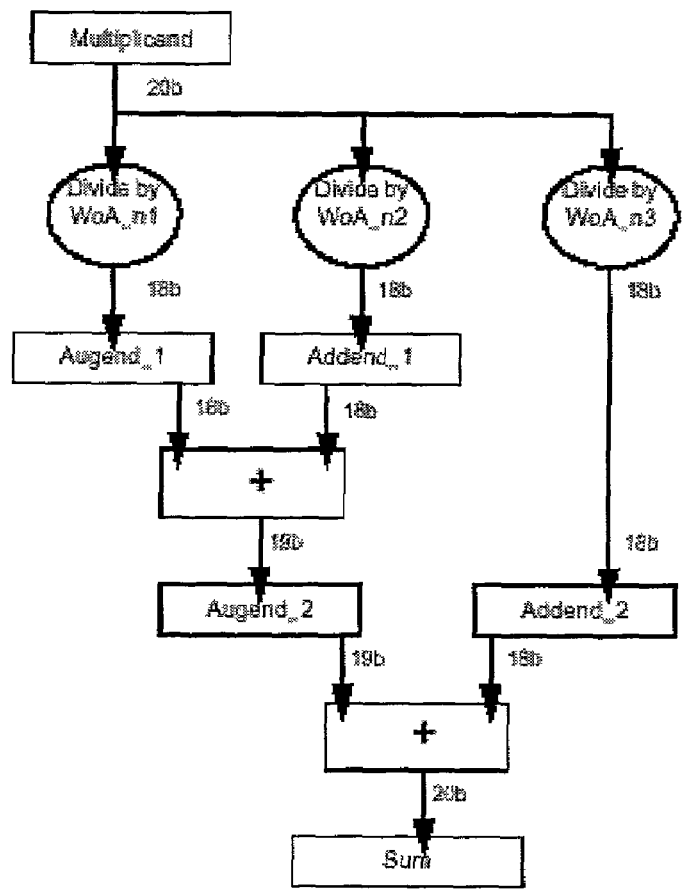
FIG. 9 is a schematic diagram showing the calculation of WoA Product for Fairshare, in accordance with one embodiment of the present invention.

FIG. 9 is a schematic diagram showing the calculation of WoA Product for Fairshare, in accordance with one embodiment of the present invention. The incoming multiplicand shown at the top is either (MaxQLength (QID)−occ (QID)) for FBA QueueIDs, or (MaxQLength (QID)−PFSUnresOcc) for PFS QueueIDs. The multiplicand is a 20 bit integer representing the amount of free Cell Buffer space. The reader may find it convenient to conceive of a radix point immediately to the right of the least significant bit.

Three interim quotients (Augend_1, Addend_1, and Addend_2) are formed by shifting the multiplicand to the right (to decrease its value) in accordance with the WoA control word, so that each quotient lies within the range 1/64K-1/4 of the original multiplicand. Fresh zeros are shifted in from the left (the most significant end). The least significant bit values shifted to the right of the radix points are discarded, effectively truncating any fractional portion of the products. The 18 bit size of the quotients is sufficient to accommodate the largest quotient which is one quarter of the 20 bit multiplicand. (A right shift of two bit positions is equivalent to a division by four. The two most significant bits may be discarded because they are always zero.)

Augend_1 and Addend_1 are added. The 19 bit sum may be as great as one half of the 20 bit original multiplicand. The most significant bit of the 19 bit sum allows for the carry. The 19 bit sum is right aligned with the 18 bit Addend_2 (so that the least significant bits are aligned) before being added to create the 20 bit sum, whose maximum value may be three quarters of the value of the original multiplicand. It is expected that the WoA control word would be configured to produce far smaller results than such a maximum possible value.

Figure 10:
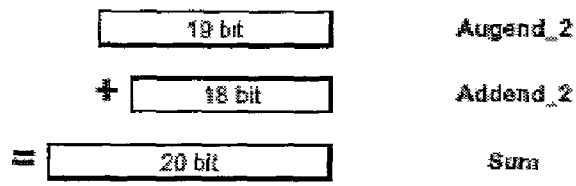
FIG. 10 shows the operation of right alignment for asymmetric addition, in accordance with one embodiment of the present invention.

FIG. 10 shows the operation of right alignment for asymmetric addition, in accordance with one embodiment of the present invention. The Sum which results from the WoA shifts and additions is the WoA product. For both FBA and PFS QueueIDs the fairshare is obtained by adding the sum and the Limit for the connection. The equations for calculating Fairshare are $$FBA\_Fairshare := Sum + Limit\ (CID); \quad \text{EQ. (2)}$$

$$PF\_Fairshare := Sum + Limit\ (CID). \quad \text{EQ. (3)}$$

The Fairshare used in the discard decision is selected according to the buffer scheme of Table 10 below.

TABLE 10

Example Buffer Scheme For Selection of Fairshare Used in the Discard Decision

```
if (BufScheme(QueueID) = PFS)
    Fairshare = PFS_Fairshare;
else
    Fairshare = FBA_Fairshare;
end if;
```

The value FairShare(CID) is an integer which represents the 'fair' number of cells permitted in the Cell Buffer on a given CID. The integer lies in the range [O,1M] being the range of Cell Buffer locations.

Discard Algorithm

The discard decision is made by a common algorithm for both FBA and PFS using the Fairshare value calculated above. The value of Fairshare is that defined earlier. The algorithm is shown in Table 11 below.

TABLE 11

Example of Common Algorithm for disacrd Decision for Both FBA and PFS Using the Fairshare Value calculated in EQ. (2) and EQ. (3).

```
function Discard( )
    PPD1_Shared :=
        FairShare − (DiscRAM(CID).PlMant *
        (2**DiscRAM(CID).PlExp))
    if (CDDisc.AAL5 = 1)
        AAL5DiscProc( );
    else
        if (CIDCount < PPD1_Shared)
            AcceptCell( );
        else if (CDDisc.CLP = 1)
            DiscardCell( );
        else if (CIDCount < FairShare)
            AcceptCell( );
        else
            DiscardCell( );
        end if
    end if
end PrFairShDiscard
```

The PPD 1 threshold is calculated as an offset below the fairshare. Traffic on AAL5 connections is treated separately to permit operations at the frame level. The AAL5 procedure is described later. Cells are accepted while the buffer fill for that connection is below all thresholds. When the fill equals or exceeds the CLP=1 threshold (PPD1-Shared) but not the fairshare threshold all cells with CLP=0 are accepted and all cells with CLP=1 are discarded. While the fill equals or exceeds the fairshare all cells are discarded.

AAL5 Algorithm

The AAL5 algorithm operates similarly to the Discard algorithm, but with frame awareness. AAL5 traffic is discarded at the packet or frame level instead of the cell level. Frame level discard provides much more efficient use of buffers and other resources throughout the entire network. The discard mechanism, which is applied to connections which carry AAL5 traffic, is consequently a little more complex in two respects. Firstly, if a cell is discarded midway through an AAL5 frame then the remainder of that frame is discarded, except for the EOF cell. There is no purpose in knowingly propagating corrupted frames. The EOF cell is transmitted to enable the receiving end user to clear the way for following frames without waiting for time-outs, and so that the following frame remains correctly delimited. This process is termed Partial Packet Discard (PPD).

Secondly, when the onset of congestion is detected, a decision is made to reject subsequent incoming frames so that the discard coincides with complete frame boundaries. Any frames which are currently in train are permitted through to completion, subject to other buffer requirements. This process is termed Early Packet Discard (EPD).

No hysteresis is provided on PPD or EPD threshold transitions. The values of Fairshare and PPD1_Shared are those defined earlier. The thresholds are again calculated as offsets below the fairshare. Note that the state values are not updated until after the function ends.

TABLE 12

Example Algorithm for AAL5 Discard.

```
function AAL5DiscProc( )
  AAL5StateMachine( );
  CalcREDAvg( );
  (DiscRAM(CID).EOMant*(2**DiscRAN(CID).EOExp));
  EPDThreshl = FairShare-
  (DiscRAM(CID) .ElMant*(2**DiscRAM(CID).ElExp));
  if (CIDCount < EPDThreshl)
    EPDlFlag := KEEP;
    EPD0Flag := KEEP;
  else if (CIDCount < EPDThresh0)
    EPDlFlag := DISC;
    EPD0Flag := KEEP;
  else
    EPDlFlag := DISC;
    EPD0Flag := DISC;
  endif;
  EPDStateMachine( );
  if ((CDDisc.CLP = 1) and (DISCRAM(CID).EPDlState = DISC))
    DiscardCell ( );
  else if (DiscRAM(CID).EPD0State = DISC)
    DiscardCell( );
  else if (DiscRAM(CID).PPDFlag = DISC)
    if (CDDisc.PTI = EOF)
      AcceptCell;
      CDInfo(CID).PPDFlag = KEEP;
    else
      DiscardCell( );
    end if;
  else if (CIDCount < PPD1_Shared)
    AcceptCell;
  else if (CDDisc.CLP = 1)
    DiscardCell( );
    DiscRAM(CID).PPDFlag := DISC;
  else if (CIDCount < FairShare)
    AcceptPFSCell( );
  else
    DiscardCell( );
```

TABLE 12-continued

Example Algorithm for AAL5 Discard.

```
    DiscRAM(CID).PPDFlag := DISC;
  end if
end AAL5DiscProc
```

End of Frame (EOF) cells on AAL5 CIDs are never discarded by the partial packet discard process. Early packet discard is always invoked for CLP=1 cells whenever early packet discard is invoked for CLP=0 cells, in order to ensure that the complete frame is discarded irrespective of whether a frame contains a mixture of CLP=0 and CLP=1 cells. If EPD is to be invoked for CLP=0 cells, then CLP=1 cells within the discarded frame are also discarded. EOF cells may be discarded when the buffer fill on the ConnectionID exceeds Fairshare.

AAL5 Frame State Machines

A simple state machine determines whether an AAL5 frame is in train or a frame boundary has been reached, at which point EPD may be invoked. The FSS does not support AAL5 discard functions on Virtual Path (VP) connections because frames from multiple Virtual Channel (VC) connections may appear to be interleaved on the same CID at that level. For CDs whose PTI field lies in the range [0, 3] (the most significant bit of the PTI is clear) the least significant bit defines whether or not the CD represents an End of Frame (EOF) cell. If the EOF bit is set then the CD is an EOF CD, otherwise the CD is at the beginning of or within an AAL5 frame.

TABLE 13

Example Function for the AAL5 State Machine.

```
function AAL5StateMachine( )
  if (PTI < 4)                    --only user cells
    EOFbit := PTI[bit0];
  else
    EOFbit := NOTEOF;
  end if;
  if (EOFbit = EOF)
    DiscRAM(CID).AAL5state := idle;
  else
    DiscRAM(CID).AAL5state := rxpkt;
  end if
end AAL5StateMachine
```

The AAL5 State Machine maintains for each CID the state of the AAL5 frame. The state becomes idle while no frame is in train. The EPD state machine below 'remembers' that frame discard should commence after the current frame has passed through completely. The current frame is not to be corrupted. A separate EPD state is maintained for each CLP.

TABLE 14

Example Function for the EPD State Machine.

```
function EPDStateMachine( )
  if ((EPDlFlag = Disc) and (AAL5State = idle))
    DiscRAM(CID).EPDlstate := Disc;
  else if ((EPD0Flag = Keep) and (AAL5State = idle))
    DiscRAM(CID) .EFDlState := Keep;
  end if if ((EPD0Flag = Disc) and (AAL5State = idle))
    DiscRAM(CID) .EPD0State Disc;
  else if ((EPD0Flag = Keep) and (AAL5State = idle))
    DiscRAM(CID) .EPD0State := Keep;
  end if
end EPDStateMachine
```

Acceptance of a Cell into the Cell Buffer

When a cell is accepted into the Cell Buffer the counters are incremented.

TABLE 19

Example Function for Incrementing the Counters When a Cell Is Accepted into the Cell Buffer.

```
function AcceptCell( )
    QueueIDInfo(QID).Acc + 1;
    QueueIDInfo(QID).Occ + 1;
    if (DiscRAM(CID).CIDCount = 0)
        QueueIDInfo(QID).NumOccCIDs + 1;
    end if
    DiscRAM(CID).CIDCount + 1;
    if (BufScheme(QID) = PFS)
        PFSOcc + 1;
        if (CIDCount(CID) >= Limit (CID) then
            if (PFSUnresOcc < MaxRAMSize) then
                PFSUnresOcc := PFSUnresOcc + 1;
            else
                assert PFSUnresOcc overflow interrupt PURO_OFLOW;
            end if;
        end if;
    end if;
end AcceptCell
```

Discarded Cells

Alternatively, if the cell is rejected the CellPointer is returned to the Free List and the CellPointer and CID fields are zeroed to indicate to the QSS that the CD is a null CD. Cells may be discarded by either the FBA or the PFS discard schemes. Each time a cell is discarded one discarded cell counter is incremented. One discarded cell counter is maintained for each QueueID for each of CLP=0 (DiscO(QID)) and CLP=1 (Disc 1(QID)) cells, a total of 32 counters.

The Discard process shown in Table 20 below is performed for both FBA and PFS discards.

TABLE 20

Example Discard Process Performed for both FBA and PFS discards.

```
function DiscardCell( )
    ReturnPtr( );           --return CellPtr from CD
    CDDisc.CID := 0;
    CDDisc.CellPtr := 0;
    CDDisc.CellType := NoData;
    if (CLP=0)
        DiscO(QID) + 1;
    else
        Disc1(QID) + 1;
    end if;
    if (CDDisc.MCC = 1)
        Remap(OrigCellPtr).CopyCount –1;
        if (Remap(OrigCellPtr).CopyCount =0)
            Return Ptr(OrigCellPtr);
        end if
    end if
end DiscardCell
```

CellPointers from discarded CDs are returned to the Free List, including dummy CellPointers from discarded (MCC=1) multicast copies.

Ultimate Discard Backstop

In addition to the FBA and PFS discard mechanisms the Discard Block implements a default backstop discard mechanism to protect against the failure or misconfiguration of the buffer management system. While the Free List is empty the CellPointer or CellPointers presented to the EBISS subsystem remain constant causing each cell to overwrite the previous cell irrespective of whether the cell is to be accepted or discarded. The CellPointer advances only after one becomes available from the Free List.

CD from the Discard Block

The CD which emerges from the Discard block contains the information shown below in Table 25.

TABLE 25

Example of Information Contained in Cell Descriptor (CD) that emerges from Discard block.

```
type CDDisc
    CellPtr[19:0];    --CellPointer
    PTI[2:0];         --PTI from cell header
    CLP;              --CLP from cell header
    CID[15:0];        --connection identifier
    QID[3:0];         --QueueID
    MCC;              --MC copied cell
    CellType;         --ABR VD f-RM, ER f-RM, NoDATA, or NORMAL
```

CPU Access

The CPU configures DiscRAM at initialization and during operation. One CPU write cycle is provided to Discard RAM per MTS. The CPU reads CID and other counters listed in 'Operations'. One CPU read cycle is provided per MTS. It is not possible for the CPU to write to the counters in the Discard RAM.

Cell Slot Generator

The Cell Slot Generator allows cells to be inserted into free timeslots in the stream to the QSS. The Cell Slot Generator generates CDs which act as place holders for cells.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, designating fixed buffer allocation space and designating prioritized fair share buffer space, according to processes of the present invention.

In the foregoing specification, the invention has been described with reference to specific embodiments thereof. It will, however, be evident that various modifications sand changes may be made thereto without departing from the broader spirit and scope of the invention. The specification and drawings are, accordingly, to be regarded in an illustrative rather than a restrictive sense.

What is claimed is:

1. A method of discarding a prioritized fair share of traffic of network connections, the method comprising:
   receiving traffic of at least a particular network connection;
   filling a portion of a fixed buffer allocation space with traffic of the particular network connection, wherein a buffer in the fixed buffer allocation space is associated with a fixed buffer allocation queue identification, wherein the fixed buffer allocation space is associated with a first discard scheme which determines if the traffic will be accepted into the buffer;
   filling a separate portion of a prioritized fair share buffer space with traffic of the particular network connection, wherein a separate buffer in the prioritized fair share buffer space is associated with a separate prioritized fair share queue identification, wherein the prioritized fair share buffer space is associated with a second discard scheme which determines if the traffic will be accepted into the separate buffer, the second discard scheme being different than the first discard scheme; and
   discarding the portion of the fixed buffer allocation space or the separate portion of the prioritized fair share buffer space as lowest priority traffic of the particular network connection based on the first discard scheme or the second discard scheme, the first or second discard scheme determined based on the fixed buffer allocation queue identification or the separate prioritized fair share queue identification associated with the lowest priority traffic.

2. The method of claim 1, wherein the fixed buffer allocation space is configured to provide a semi-permanent minimum buffer space to each network connection.

3. The method of claim 1, wherein the fixed buffer space is configured to provide a guaranteed minimum buffer space to each network connection.

4. The method of claim 3, wherein each prioritized fair share queue identification includes a relative ranking amongst the prioritized fair share queue identifications.

5. The method of claim 1, wherein the shared buffer space is configured to provide a non-guaranteed buffer space to each network connection, and is configured to be shared amongst network connections.

6. The method of claim 5, wherein a portion size for each network connection is based upon a weighting value assigned to each network connection.

7. The method of claim 5, wherein the step of filling a portion of the prioritized fair share buffer space comprises comparing buffer usage of the particular network connection with buffer usages of other network connections to obtain a weighting value for the particular network connection.

8. The method of claim 1, further comprising:
   receiving traffic of at least one other network connection;
   filling another portion of the fixed buffer allocation space with traffic of the at least one other network connection; and
   filling another portion of the prioritized fair share buffer space with traffic of the at least one other network connection.

9. The method of claim 8, wherein the traffic of the particular network connection has a lower quality of service value than that of traffic of the at least one other network connection, and wherein the discarding step comprises discarding traffic of the particular network connection.

10. The method of claim 1, wherein the step of filling the portion of the prioritized fair share buffer space comprises filling substantially all of the prioritized fair share buffer space, and wherein the discarding step is triggered by the step of filling substantially all of the prioritized fair share buffer space.

11. A computer-readable medium carrying one or more sequences of one or more instructions for discarding a prioritized fair share of traffic of network connections, the one or more sequences of one or more instructions including instructions which, when executed by one or more processors, cause the one or more processors to perform the steps of:
   receiving traffic of at least a particular network connection;
   filling a portion of a fixed buffer allocation space with traffic of the particular network connection, wherein a buffer in the fixed buffer allocation space is associated with a fixed buffer allocation queue identification, wherein the fixed buffer allocation space is associated with a first discard scheme which determines if the traffic will be accepted into the buffer;
   filling a separate portion of a prioritized fair share buffer space with traffic of the particular network connection, wherein a separate buffer in the prioritized fair share buffer space is associated with a separate prioritized fair share queue identification, wherein the prioritized fair share buffer space is associated with a second discard scheme which determines if the traffic will be accepted into the separate buffer, the second discard scheme being different than the first discard scheme; and
   discarding the portion of the fixed buffer allocation space or the separate portion of the prioritized fair share buffer space as lowest priority traffic of the particular network connection based on the first discard scheme or the second discard scheme, the first or second discard scheme determined based on the fixed buffer allocation queue identification or the separate prioritized fair share queue identification associated with the lowest priority traffic.

12. The computer-readable medium of claim 11, wherein the fixed buffer allocation space is configured to provide a semi-permanent minimum buffer space to each network connection.

13. The computer-readable medium of claim 11, wherein the fixed buffer space is configured to provide a guaranteed minimum buffer space to each network connection.

14. The computer-readable medium of claim 13, wherein each prioritized fair share queue identification includes a relative ranking amongst the prioritized fair share queue identifications.

15. The computer-readable medium of claim 11, wherein the shared buffer space is configured to provide a non-guaranteed buffer space to each network connection, and is configured to be shared amongst network connections.

16. The computer-readable medium of claim 15, wherein a portion size for each network connection is based upon a weighting value assigned to each network connection.

17. The computer-readable medium of claim 15, wherein the step of filling a portion of the prioritized fair share buffer space comprises comparing buffer usage of the particular network connection with buffer usages of other network connections to obtain a weighting value for the particular network connection.

18. The computer-readable medium of claim 11, wherein the instructions further cause the processor to carry out the steps of:
   receiving traffic of at least one other network connection;
   filling another portion of the fixed buffer allocation space with traffic of the at least one other network connection; and
   filling another portion of the prioritized fair share buffer space with traffic of the at least one other network connection.

19. The computer-readable medium of claim 18, wherein the traffic of the particular network connection has a lower quality of service value than that of traffic of the at least one other network connection, and wherein the discarding step comprises discarding traffic of the particular network connection.

20. The computer-readable medium of claim 11, wherein the step of filling the portion of the prioritized fair share buffer space comprises filling substantially all of the prioritized fair share buffer space, and wherein the discarding step is triggered by the step of filling substantially all of the prioritized fair share buffer space.

21. An integrated circuit configured to discard a priority fair share of traffic of network connections, the integrated circuit comprising:
   controlling circuitry configured to control operations of:
   filling a portion of a fixed buffer allocation space with traffic of the particular network connection, wherein a buffer in the fixed buffer allocation space is associated with a fixed buffer allocation queue identification, wherein the fixed buffer allocation space is associated with a first discard scheme which determines if the traffic will be accepted into the buffer;
   filling a separate portion of a prioritized fair share buffer space with traffic of the particular network connection, wherein a separate buffer in the prioritized fair share buffer space is associated with a separate prioritized fair share queue identification, wherein the separate prioritized fair share buffer space is associated with a second discard scheme which determines if the traffic will be accepted into the separate buffer, the second discard scheme being different than the first discard scheme; and
   discarding the portion of the fixed buffer allocation space or the separate portion of the prioritized fair share buffer space as lowest priority traffic of the particular network connection based on the first discard scheme or the second discard scheme, the first or second discard scheme determined based on the fixed buffer allocation queue identification or the separate prioritized fair share queue identification associated with the lowest priority traffic.

22. The method of claim 21, wherein the controlling circuitry further includes comparison circuitry configured to compare a priority of the particular network connection with priorities of other network connections to obtain a weighting value for the particular network connection.

23. The integrated circuit of claim 21, wherein the controlling circuitry is further configured to control operations of:
   filling another portion of the fixed buffer allocation space with traffic of at least one other network connection; and
   filling another portion of the prioritized fair share buffer space with traffic of the at least one other network connection.

24. The integrated circuit of claim 23, wherein the controlling circuitry is further configured to trigger the discard operation when the prioritized fair share buffer space is substantially filled.

25. The integrated circuit of claim 21, wherein the traffic of the particular network connection has a lower quality of service value than that of traffic of at least one other network connection, and wherein the controlling circuitry is further configured to control discarding of traffic of the particular network connection.

26. The integrated circuit of claim 21, wherein the controlling circuitry is further configured to trigger the discard operation when a local buffer is substantially filled, wherein the local buffer includes the fixed buffer allocation space and the reserved buffer space.

27. A method of allocating memory buffer space for traffic of network connections, the method comprising:
   designating fixed buffer allocation space;
   associating buffers in the fixed buffer allocation space with fixed buffer allocation queue identifications;
   associating the fixed buffer allocation space with a first discard scheme, wherein the first discard scheme determines if the traffic of the network connections will be accepted into the buffers in the fixed buffer allocation space or if the traffic of the network connections will be discarded;
   designating prioritized fair share buffer space;
   associating buffers in the prioritized fair share buffer space with prioritized fair share queue identifications;
   prioritizing the prioritized fair share queue identifications to have relative rankings amongst the prioritized fair share queue identifications;
   associating a particular network connection in a first group of network connections with a particular prioritized fair share queue identification;
   reserving a portion of the prioritized fair share buffer space for the first group of network connections;
   allocating unreserved buffers in the prioritized fair share buffer space for the first group of network connections, wherein network connections in the first group of network connections associated with higher priority prioritized fair share queue identifications have access to a greater portion of the unreserved buffers in the prioritized fair share buffer space than network connections in the first group of network connections associated with lower priority prioritized fair share queue identifications;
   associating the prioritized fair share buffer space with a second discard scheme, wherein the second discard scheme determines if the traffic of the network connections will be accepted into the buffers in the prioritized fair share buffer space or if the traffic of the network connections will be discarded, and wherein the second discard scheme is different than the first discard scheme.

28. The method of claim 27, further comprising prioritizing the fixed buffer allocation queue identifications to have relative rankings amongst the fixed buffer allocation queue identifications.

29. The method of claim 27, further comprising associating a particular network connection in a second group of network connections with a particular fixed buffer allocation queue identification.

30. The method of claim 29, further comprising reserving a portion of the fixed buffer allocation space for the second group of network connections.

31. The method of claim 30, further comprising allocating unreserved buffers in the fixed buffer allocation queue identifications, wherein the particular network connection in the second group of network connections associated with the particular fixed buffer allocation queue identification has access to the unreserved buffers in the particular fixed buffer allocation queue identification.

32. The method of claim 27, wherein a weighting value for each network connection in the first group of network connections is determined, and wherein a first network connection in the first group of network connections having a higher weighting value than a second network connection in the first group of network connections is proportionately allocated a greater portion of the unreserved buffers in the prioritized fair share buffer space.

* * * * *